(12) United States Patent
Rauhala et al.

(10) Patent No.: US 8,185,601 B2
(45) Date of Patent: May 22, 2012

(54) SHARING INFORMATION BETWEEN DEVICES

(75) Inventors: Ari-Petri Olavi Rauhala, Tampere (FI);
Sergey Alexandrovich Burnevsky, Tampere (FI)

(73) Assignee: Nokia Corporation, Espoo (FI)

( * ) Notice: Subject to any disclaimer, the term of this patent is extended or adjusted under 35 U.S.C. 154(b) by 328 days.

(21) Appl. No.: 12/118,724

(22) Filed: May 11, 2008

(65) Prior Publication Data

US 2009/0282124 A1   Nov. 12, 2009

(51) Int. Cl.
  *G06F 15/167* (2006.01)
  *G06F 15/16* (2006.01)
  *G06F 12/02* (2006.01)
  *G06F 7/00* (2006.01)

(52) U.S. Cl. ............ 709/216; 709/217; 711/1; 707/705; 707/706

(58) Field of Classification Search ............... 709/217; 340/825; 711/1; 707/705, 706
See application file for complete search history.

(56) References Cited

U.S. PATENT DOCUMENTS

| 7,310,629 | B1 * | 12/2007 | Mendelson et al. ................ 1/1 |
| 2002/0147771 | A1 * | 10/2002 | Traversat et al. ............ 709/203 |
| 2003/0050959 | A1 * | 3/2003 | Faybishenko et al. ........ 709/202 |
| 2003/0182327 | A1 | 9/2003 | Ramanujam et al. |
| 2007/0022158 | A1 | 1/2007 | Vasa et al. |
| 2007/0288164 | A1 | 12/2007 | Gordon et al. |

FOREIGN PATENT DOCUMENTS

JP  2006-133841 A  5/2006

OTHER PUBLICATIONS

International Search Report and Written Opinion, PCT/FI2009/050323, Aug. 14, 2009, pp. 1-15.
Korean Office Action for corresponding KR Application No. 2009-7019050 dated Mar. 30, 2011, pp. 1-4.
Chinese Office Action for CN Application No. 200980000096.9 dated Dec. 31, 2011, pp. 1-9.

* cited by examiner

*Primary Examiner* — Philip Chea
(74) *Attorney, Agent, or Firm* — Ditthavong Mori & Steiner, P.C.

(57) ABSTRACT

A system configured for facilitating the sharing of information between apparatuses. An apparatus may include one or more applications that, for example, upon configuration and execution, may yield information that may also be stored in the apparatus. At some point a determination may be made that stored information is to be shared with other users. In order to enable the sharing of this information, global identification information may be assigned by, and obtained from, a remote resource. The global identification information may be used to modify identification information corresponding to the information to be shared so that other apparatuses may locate, and/or request access to, the shared information. Further, the other apparatuses may request transmission of shared information stored in the remote resource using the global identifier, or may receive shared information from the apparatus without explicitly requesting it.

31 Claims, 11 Drawing Sheets

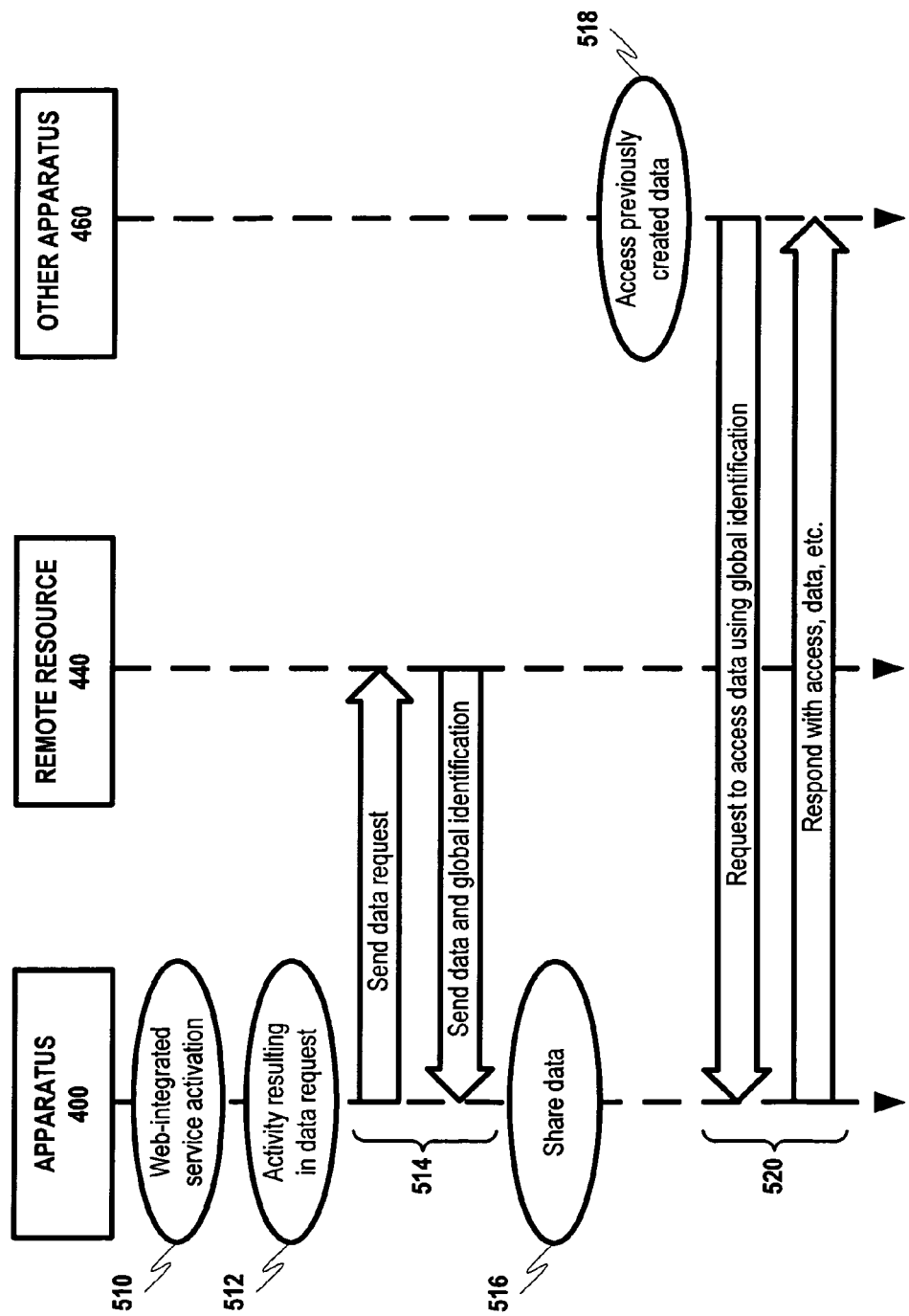

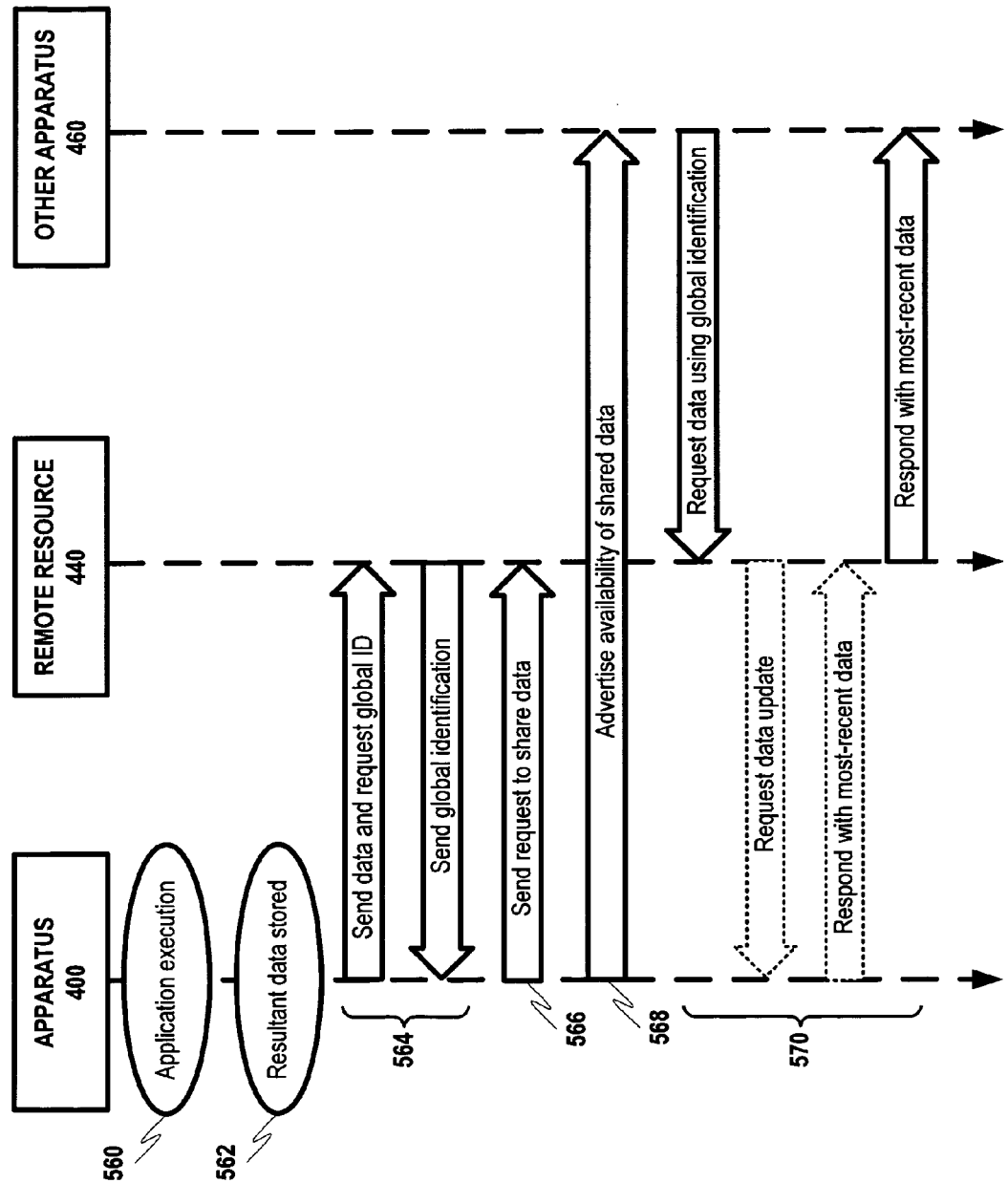

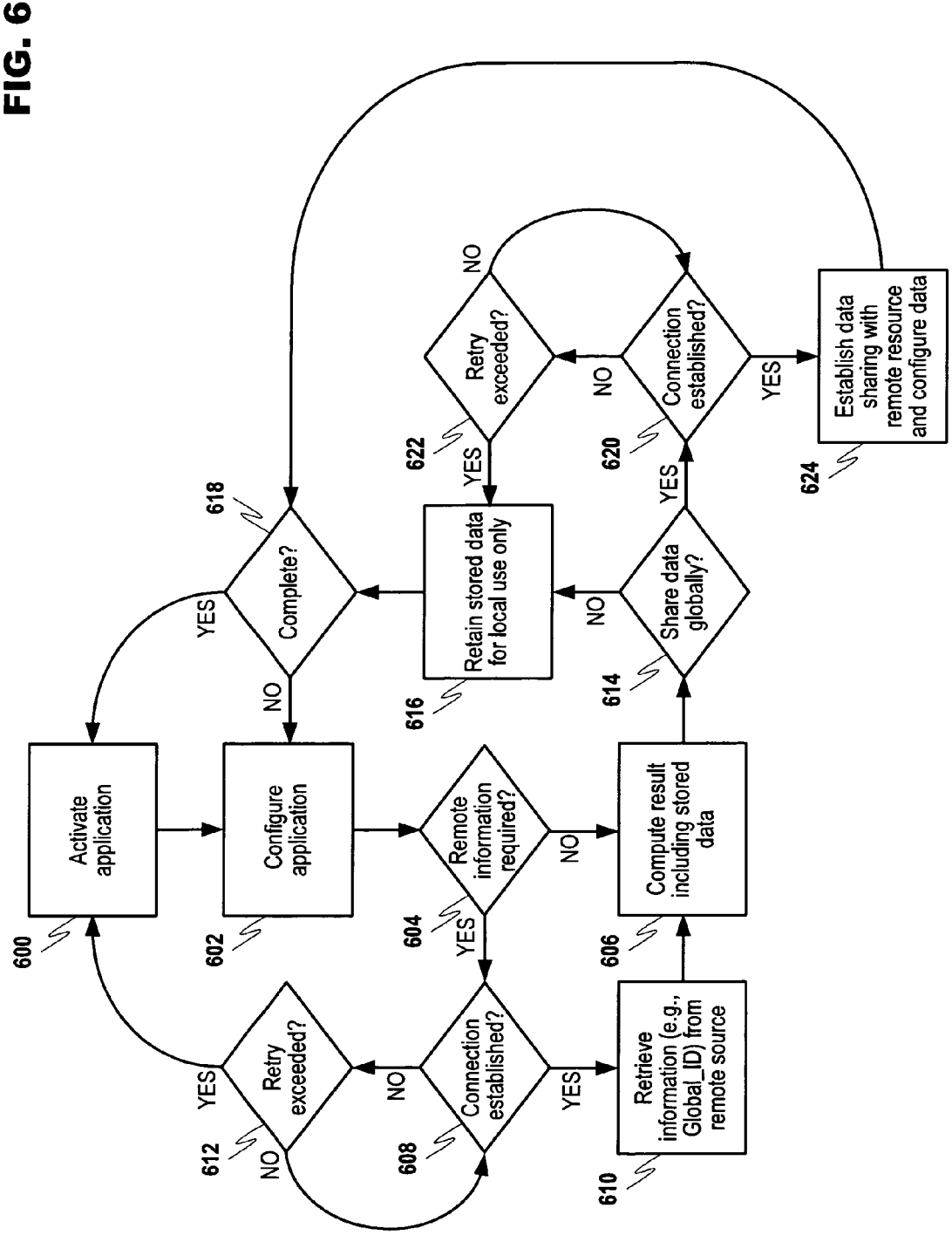

SHARING INFORMATION BETWEEN DEVICES

BACKGROUND

1. Field of Invention

Various embodiments of the present invention relate to sharing resource information via wired and/or wireless communication.

2. Background

Modern society has adopted, and is becoming reliant upon, devices for wireless communication. For example, cellular telephones continue to proliferate in the global marketplace due to technological improvements in both communication quality and device functionality. These wireless communication devices (WCDs) have become common for both personal and business use, allowing users to transmit and receive voice, text and graphical data from a multitude of geographic locations. The communication networks utilized by these devices span different frequencies and cover different transmission distances, each having specific features desirable for various applications.

The desire for users to employ wireless apparatuses in many different settings continues to keep pace with new communication enhancements incorporated in these devices. Additional functionality such as, for example, messaging clients (email, instant messenger, etc.), business applications (document readers, scheduling programs, interfaces to inventory management systems, etc.), location systems (GPS, mapping, navigation, etc.), multimedia and entertainment applications, as well as many more. These various applications may retrieve information via wired or wireless communication that, in view of a user configuration, may be required in order to perform the requested activity. The information needed during application execution may come from, for example, a remote source accessible via wireless communication.

While the above exemplary applications, and any results outputted during their execution, may only reside locally on an apparatus, it is foreseeable that in some cases the results of these applications would not only be desirable to the initially requesting user, but also to other consumers that are interested in the same information. Typical architectures utilized in storing information for public consumption usually central the shared materials, or references to the shared materials in the form of, for example, a cross-reference table. At least one problem with this exemplary configuration is that a great deal of resource overhead is created by maintaining a centrally located cross-reference resource. The various burdens on the system may include, for example, the need for a large amount of storage space to house the cross-reference information, substantial processing to receive, maintain and deliver the shared information to various consumers using the local references of target device, high bandwidth access enabled to support a large amount of simultaneous connections both contributing and retrieving information, etc.

SUMMARY

Various embodiments of the present invention are directed to at least a method, system, device and computer program for sharing information. For example, an apparatus may include at least one application that, upon configuration and execution, may yield one or more pieces of information that may also be stored in the apparatus. After a determination is made that stored information is to be shared with other users, identification information may be assigned to each of the one or more pieces of information that is recognizable by the other users. The identification information may include at least global identification information assigned by, and obtained from, a remote resource. The global identification information may be used to modify the identification of the one or more pieces of information to be shared so that other apparatuses may locate, and/or request access to, the shared information. Further, the other apparatuses may request transmission of shared information stored in the remote resource using the global identifier, or may receive shared information from the apparatus without explicitly requesting it.

In at least one embodiment of the present invention, an inquiry may be made when an application is executed as to whether additional information is required to complete processing. The apparatus may obtain the additional information from the remote resource via wired or wireless communication. At least some of the additional information may be used for computing resultant information, while some of the information may be for global identification.

The stored information may, in accordance with various embodiments, be assigned a local identifier usable by consumers within the apparatus. However, a determination may further be made to share the stored information. This determination may be made, for example, based on a configuration in the apparatus or based on an automated decision made in view of automated decision criteria. Global identification information may then be requested from a remote resource, for example, via wireless communication. The remote resource may then assign particular global identification information to the shared information, which is then forwarded to the apparatus. The apparatus may then modify the identification corresponding to the shared information based on the global identification information.

In at least one exemplary scenario, other devices desiring to access the shared information may obtain global identification information from the apparatus or the remote resource. These other apparatuses may then request access to shared information stored on the apparatus using the global identification information, or alternatively, may request that shared information stored on the apparatus be sent to other apparatuses (e.g., in one or more wireless messages). The apparatus may then respond by providing access to the shared information as requested. Further, other apparatuses may receive unsolicited transmissions regarding shared information from the apparatus. The other apparatuses may identify the shared information, as well as trace the information back to the source, based on the global identification information.

DESCRIPTION OF DRAWINGS

The invention will be further understood from the following detailed description of various exemplary embodiments, taken in conjunction with appended drawings, in which:

FIG. 5B discloses a timeline diagram of an exemplary interaction between a wireless apparatus, a remote resource and another apparatus in accordance with at least one embodiment of the present invention.

FIG. 5D discloses a timeline diagram of a third exemplary interaction between a wireless apparatus, a remote resource and another apparatus in accordance with at least one embodiment of the present invention.

FIG. 6 discloses a flowchart for an exemplary process in accordance with at least one embodiment of the present invention.

DESCRIPTION OF EXEMPLARY EMBODIMENTS

While the present invention has been described in a variety of exemplary embodiments, various changes can be made therein without departing from the spirit and scope of the invention, as described in the appended claims.

I. Wireless Communication Over Different Communication Networks

Figure 1:
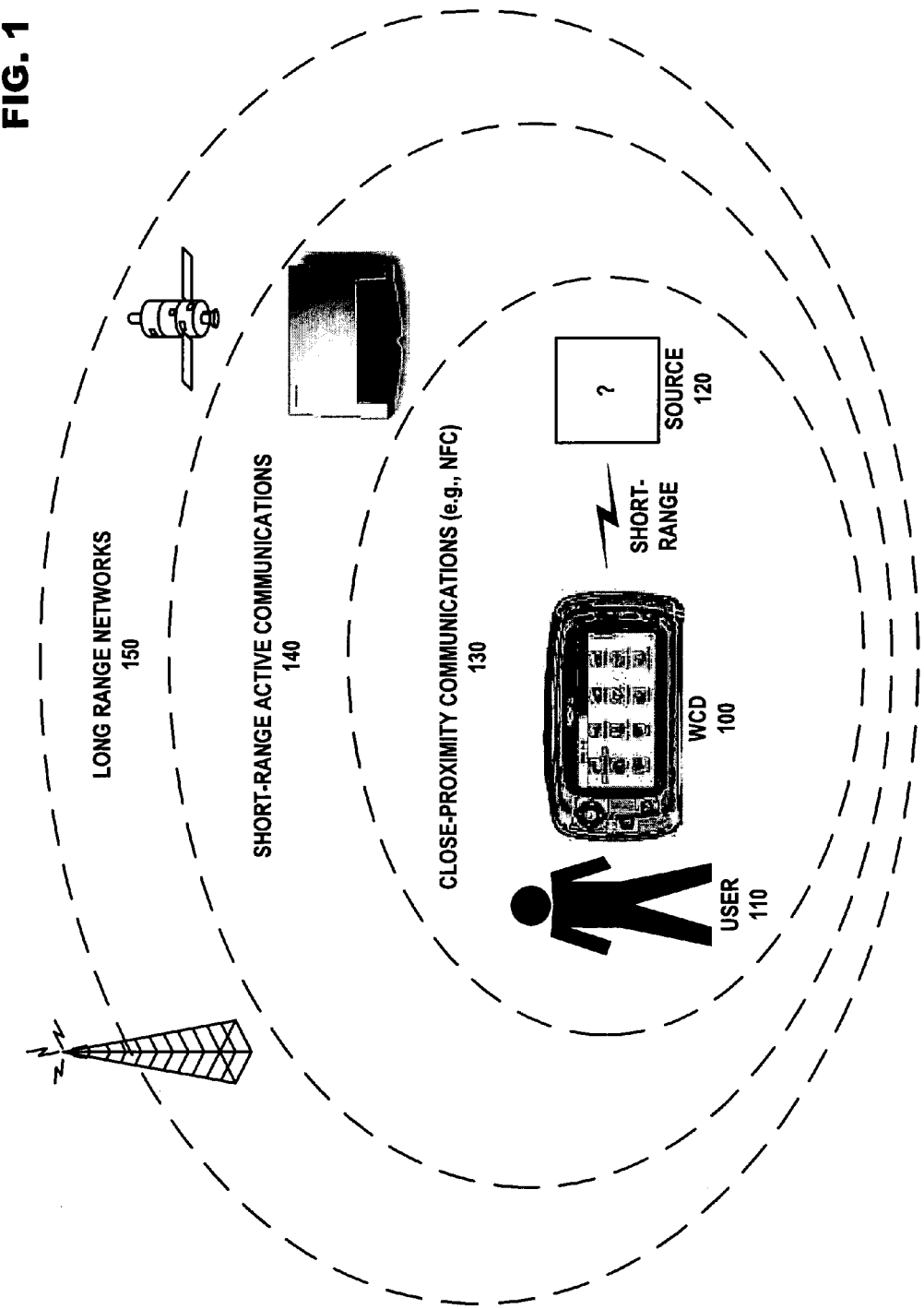
FIG. 1 discloses an exemplary wireless operational environment, including wireless communication mediums of different effective range.

Wireless communication devices (WCD) may transmit and receive information over a wide array of communication networks, each with different advantages regarding speed, range, quality (error correction), security (encoding), etc. These characteristics may determine the amount of information that can be transferred to a receiving device and the duration of time for this information transfer. FIG. 1 includes a diagram of an exemplary WCD and how it may interact with various types of wireless technologies.

In the example pictured in FIG. 1, user 110 possesses WCD 100. This device may be anything from a basic cellular handset to a more complex device such as a wirelessly enabled palmtop or laptop computer. Close-proximity communications 130 may include various transponder-type interactions wherein normally only the scanning device requires its own power source. WCD 100 scans source 120 via short-range communication. A transponder in source 120 may utilize the energy and/or clock signal contained within the scanning signal, as in the case of RFID communication, to respond with data stored in the transponder. These types of technologies usually have an effective transmission range on the order of ten feet. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communication. Short-range active communication 140 includes applications wherein the sending and receiving devices are both active. An exemplary situation would include user 110 coming within effective transmission range of a Bluetooth™, WLAN, UWB, WUSB, etc. access point. In the case of Bluetooth™, a network may automatically be established to transmit information to WCD 100 possessed by user 110. The amount of information to be conveyed is unlimited, except that it must all be transferred in the time when user 110 is within effective transmission range of the access point. Due to the higher complexity of these wireless networks, additional time is also required to establish the initial connection to WCD 100, which may be increased if many devices are queued for service in the area proximate to the access point.

Long-range networks 150 are used to provide virtually uninterrupted communication coverage for WCD 100. Land-based radio stations or satellites are used to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, various embodiments of the present invention may be implemented utilizing a multitude of wired and/or wireless communication technology. Therefore, it is important to understand the communication tools available to user 110 before exploring these exemplary embodiments. For example, in the case of a cellular telephone or other handheld wireless devices, the integrated data handling capabilities of the device play an important role in facilitating transactions between the transmitting and receiving devices.

Figure 2:
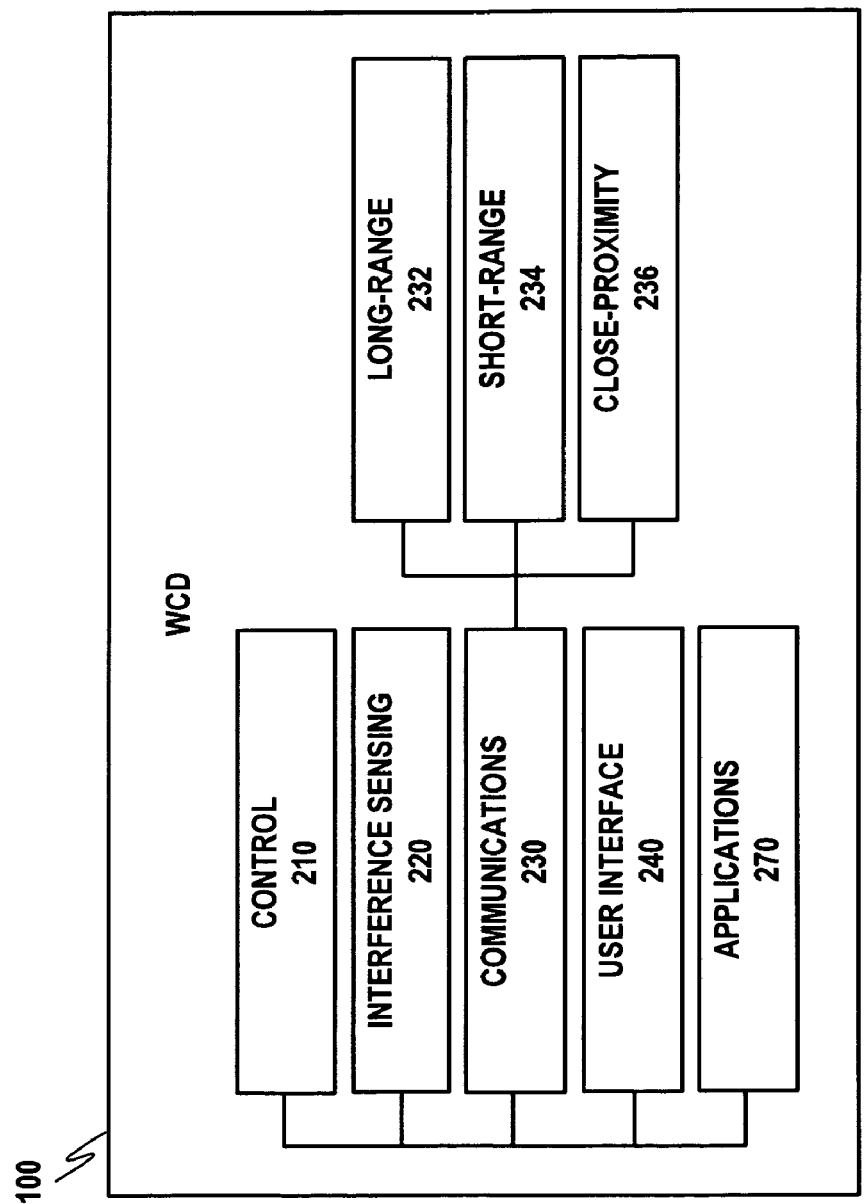
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by various combinations of the software and/or hardware components discussed below.

Control module 210 may regulate operation of the device. Inputs may be received from various other modules included within WCD 100. For example, interference sensing module 220 may use various techniques known in the art to sense sources of environmental interference within the effective transmission range of the wireless communication device. Control module 210 may interpret these data inputs, and in response, may issue control commands to the other modules in WCD 100.

Communications module 230 incorporates all of the communication aspects of WCD 100. As shown in FIG. 2, communications module 230 may include, for example, long-range communications module 232, short-range communications module 234 and close-proximity communications module 236. Communications module 230 may utilize one or more of these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
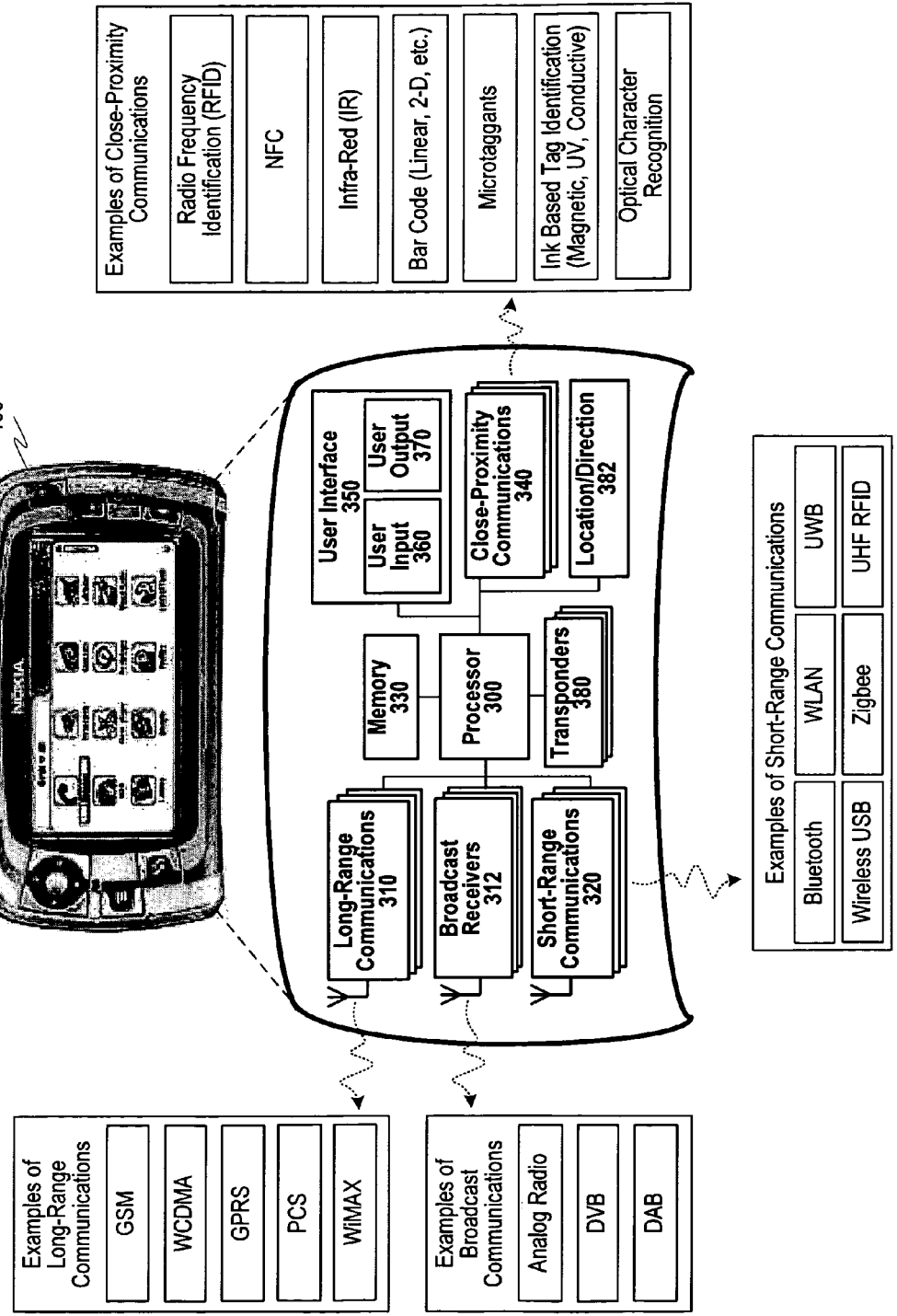
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to one or more communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 may include instructions that are executable by processor 300. Various types of software components may be stored in memory 330, such as components/modules that comprise the operating system of WCD 100, that control the operation of communication sections 310, 320 and 340, and that further enable at least the functionality described herein with respect to various embodiments of the present invention.

Long-range communications 310 performs functions related to the exchange of information over large geographic areas (such as cellular networks) via an antenna. In addition to basic voice communication (e.g., via GSM), long-range communications 310 may operate to establish data communication sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages. Various IP protocols may also be included in the long-range communication network category.

As a subset of long-range communications 310, or alternatively operating as an independent module separately connected to processor 300, transmission receiver 312 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Close-proximity communications 340, also depicted in FIG. 3, may provide functionality related to the short-range scanning of machine-readable data. For example, processor 300 may control components in close-proximity communications 340 to generate RF signals for activating an RFID transponder, and may in turn control the reception of signals from an RFID transponder. Other examples of technologies for scanning machine-readable data that may be implemented in close-proximity communications 340 may include RFID functionality corresponding to Near field communication (NFC), IR communication, linear and 2-D (e.g., QR) bar code readers (including processes related to interpreting UPC labels), and optical character recognition devices for reading magnetic, UV, conductive or other types of coded data that may be provided in a tag using suitable ink. In order for close-proximity communications 340 to scan various types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, at least one RFID scanner (or in a more specific scenario, at least one RFID scanner configurable to communicate utilizing NFC) may be mounted in an entryway may continuously emit radio frequency waves. When a person with a device containing transponder 380 walks through the door, the transponder is energized and may respond with information identifying the device, the person, etc. In addition, a scanner may be mounted (e.g., as discussed above with regard to examples of close-proximity communications 340) in WCD 100 so that it can read information from other transponders in the vicinity.

In addition to the above, resources already within WCD 100 may be reconfigured, or additional hardware and/or software may be installed, to support location, position and/or orientation-related functionality. For example, location/direction 382 may utilize software and/or hardware such as sensors, receivers, antennas, etc. configured to utilize technologies such as satellite-based or terrestrial-based (e.g., cellular) global positioning systems (GPS), electronic compasses, orientation sensors, acceleration sensors, etc. These components may be utilized with programs that may, for example, create maps, give directions, determine position, etc.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communication components stored in memory 330.

The elements shown in FIG. 3 may be constituted and coupled according to various techniques in order to produce the functionality described in FIG. 2. One such technique may link separate hardware components corresponding to processor 300, communications sections 310, 312, 320 and 340, memory 330, user interface 350, transponder 380, etc. together via one or more wired or wireless bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communication utilities software component, also contained in memory 330, which provides for the establishment of service sessions using long-range communications 310 and/or short-range communications 320. The communication utilities component may include various routines that allow the reception of services from remote devices according to mediums such as the Wireless Application Medium (WAP), Hypertext Markup Language (HTML) variants like Compact HTML (CHTML), etc.

III. An Exemplary Device Interaction Scenario

Figure 4A:
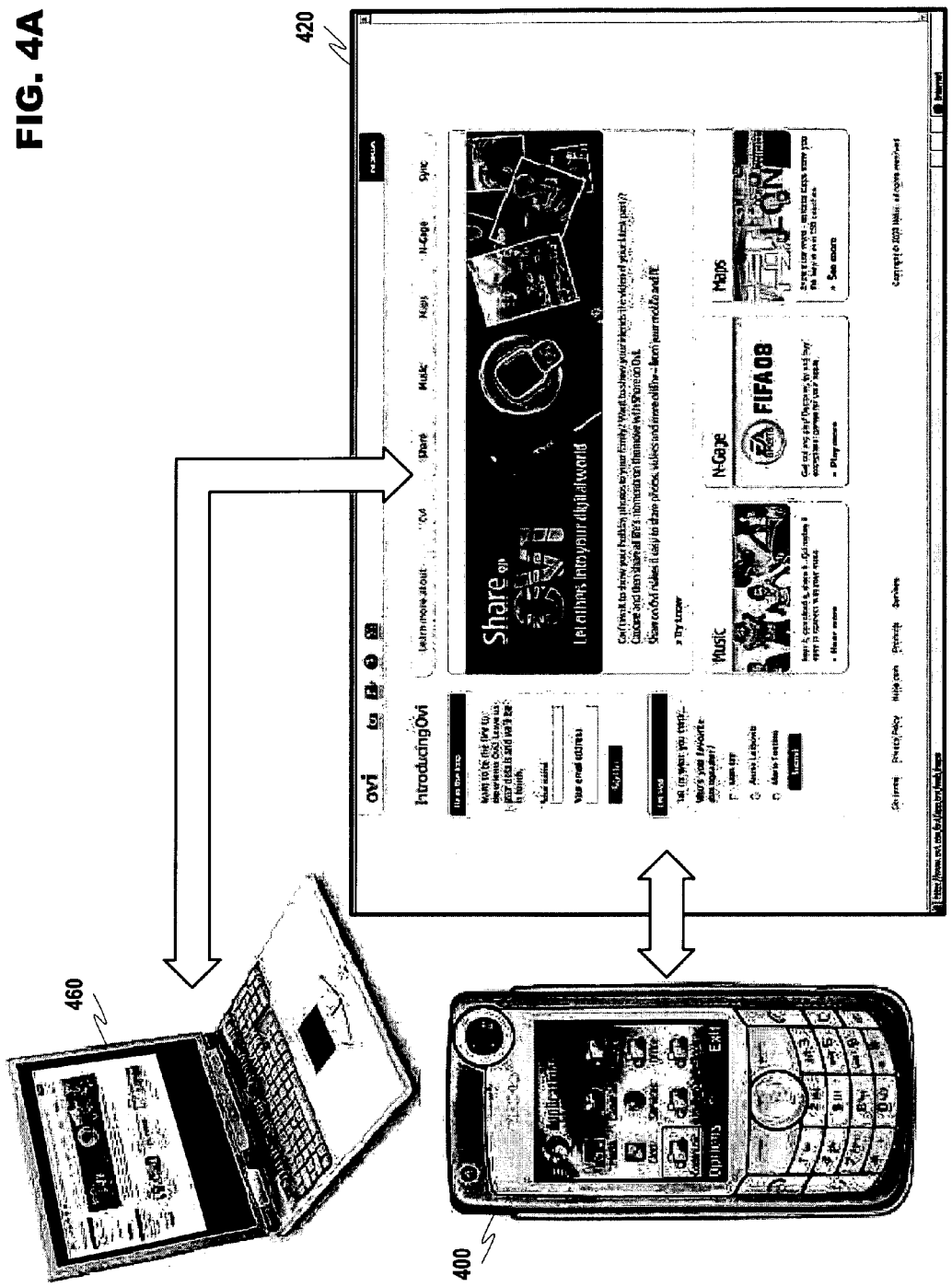
FIG. 4A discloses an exemplary interaction between various apparatuses and a remote resource in accordance with at least one embodiment of the present invention.

An example scenario is shown in FIG. 4A that will be utilized to explain various embodiments of the present invention. The practice of the various embodiments of the present invention are not strictly limited to the examples disclosed herein, and may be implemented in a multitude of configurations. In particular, various embodiments of the present invention may be implemented with various wireless-enabled apparatuses communicating using different wireless communication mediums. Disclosed devices and/or mediums are for explanation purposes only.

Exemplary wireless apparatus 400, disclosed in FIG. 4A, may include any and/or all of the modules, components, functionality, etc. described with respect to exemplary WCD 100. Wireless apparatus 400 may participate in various interactions with remote resource 420. Remote resource 420 in this example may include one or more networked computing resources (e.g., computers, file servers, routers, modems, etc.) having an Internet webpage interface that is accessible via a wired or wireless link. These access methods may include, for example, a long-range wireless data connection (e.g., cellular communication) may be established directly with a service provider in order to access the Internet, a short-range connection established to an access point using a medium like Bluetooth™, WLAN, etc., a wired link via Ethernet, Firewire, etc.

Other apparatuses may also access remote resource 420 via the aforementioned examples of wired and/or wireless connection. For example, a computing device (e.g., a laptop computer) 460 is shown accessing remote resource 420 via a web browser. The web browser is configurable to display the Internet webpage interface of remote resource 420 so that a user of apparatus 460 can interact with various resources residing in remote resource 420. Both wireless apparatus 400 and other apparatus 460 may send information to, as well as receive information from remote resource 420. In this example, a website www.ovi.com has been used to represent remote resource 420. This website, created and supported by Nokia™, is a central repository via which users can share information (pictures, multimedia, etc.) or obtain information (e.g., maps, music, games, etc.) that may be stored or formulated according to user configuration. While this particular website has been used for the sake of example in explaining the various embodiments of the present invention, the invention is not specifically limited to the disclosed implementation.

IV. Exemplary Resources for Supporting Information Sharing

Figure 4B:
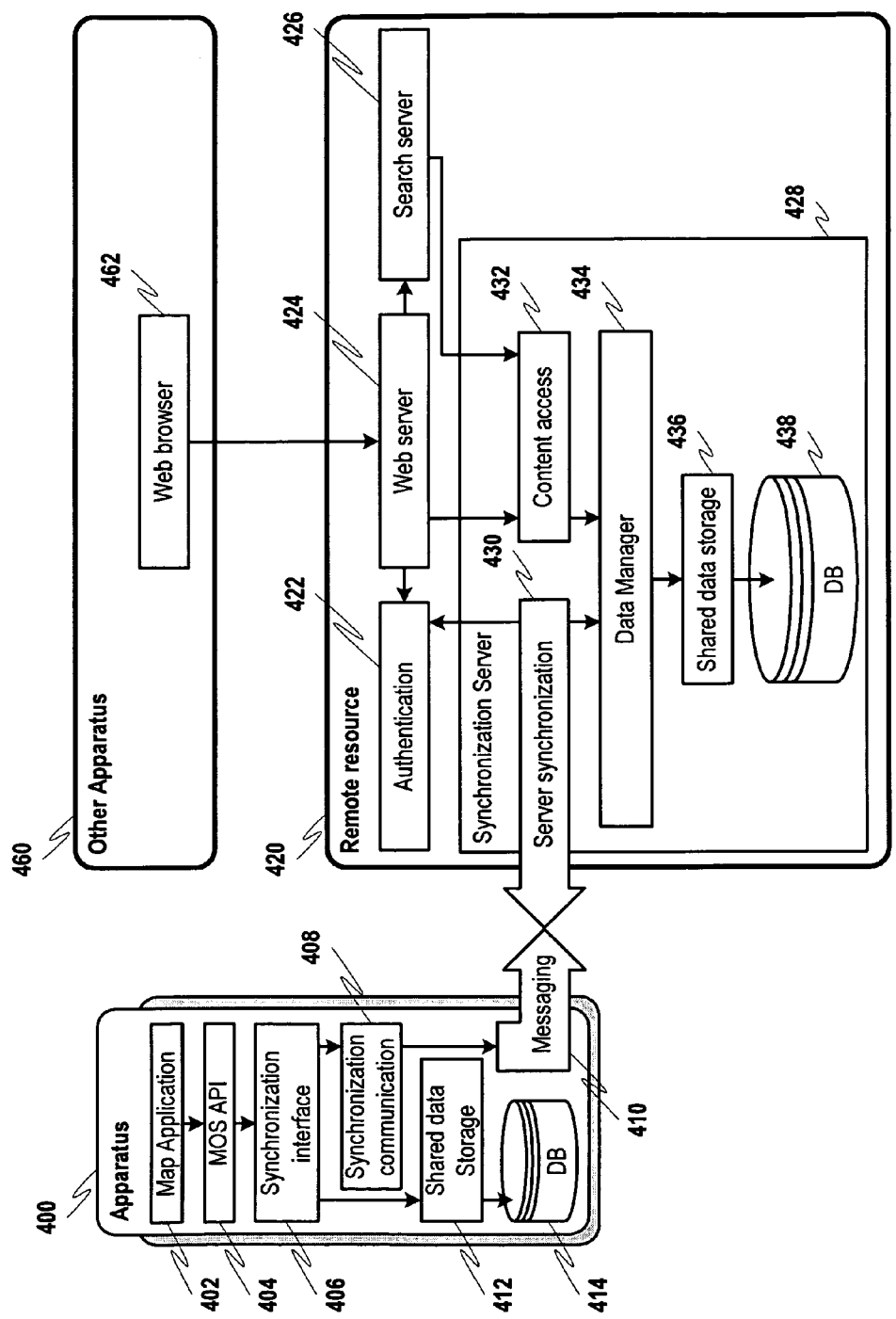
FIG. 4B discloses functional diagrams of the exemplary apparatuses and remote resource of FIG. 4A in accordance with at least one embodiment of the present invention.

In accordance with at least one embodiment of the present invention, FIG. 4B now discloses examples of functional configurations that may be utilized in apparatus 400, remote resource 420 and other apparatus 460. Apparatus 400 may include elements 402-418 implemented in software and/or hardware form, including both discrete component formats and configurations where one or more functions/elements may be including in one device (e.g., ASIC, chipset, etc). Map application (MA) 402 is an example of an user-configurable software interface for obtaining location and/or map information from, or for providing similar information to, remote resource 420 (e.g., www.ovi.com). For example, users may request information (e.g., directions, estimated time, traffic conditions, etc.) pertaining to a desired travel route by configuring a request using MA 402. An exemplary request configuration may include a user setting parameters in a software interface in order to obtain a desired output. MA 402 may then access map operating services application programming interface (MOS API) 404 to compute maps, location, direction or other related informational tasks. While various embodiments of the present invention are discussed herein in terms of exemplary map and/or location applications, this particular usage has been selected for the sake of explanation only, and is not intended to be limiting the disclosed embodiments to only being applied in this manner.

After a request has been configured by a user, MA 402 may utilize resources in apparatus 400 to access internal information, and/or may request information from an external source, in order to formulate a response to the request. The output information formulated in response to user configuration of MA 402 may, in some instances, be beneficial or desirable to other users of remote resource 420. In accordance with at least one embodiment of the present invention, information may be shared using synchronization elements 406-414 in apparatus 400.

Synchronization interface 406 may provide access to applications residing on apparatus 400 (e.g., MOS API 404) for sending information to, or receiving information from, the exemplary synchronization architecture disclosed in FIG. 4B. As part of this functionality, synchronization interface 406 may interact with synchronization elements supporting specific operations like information storage and communication. For example, shared data storage 412 and database 414 may incorporate software and/or hardware components usable for the storage of information used in a data sharing process in accordance with various embodiments of the present invention. Database (DB) 414 may contain, for example, search index data and/or actual stored information that is being made available to ("shared with") other users of remote resource 420. Synchronization communication 408 may further provide access, via messaging 410, for the transmission and reception of synchronization requests, commands and other information related to the synchronization system, such as information regarding data that is being shared.

Remote resource 420 may include exemplary elements 428-438 configured to support synchronization messaging, web browser access over an Internet connection, and sharing information amongst the users of remote resource 420 via wired and/or wireless communication. Initially connection to remote resource 420 may be controlled via authentication 422. This module may verify identification and/or security information for apparatuses, users, applications, etc. that attempt to connect to, or request information from, remote resource 420. Authentication 422 may, for example, verify the identity of entities connecting to synchronization server 428 via server synchronization 430, or from other apparatus 460 connecting to web server 424 using, for example, web browser 462. Web server 424, aside from granting general access to remote resource 420, may allow web browser 462 to connect to search server 426. Web server 424 and Search server 426 may, for example, utilize content access 432 to make search inquiries with data manager 434 in synchronization server 428 regarding shared information. For example, web browser 462 may directly access shared information via web server 424, while search server 426 may provide the ability to search for shared information in accordance with search parameters set in web browser 462.

Data manager 434 may also be accessed via server synchronization 430. This direct access may allow for synchronization of information in DB 414 and DB 438 (e.g., via shared data storage interface 436). Synchronization may ensure that data manager 434 has the most recent information regarding resources being shared by apparatuses enabled to access remote resource 420 (e.g., apparatus 400). Data stored in these apparatuses (e.g., apparatus 400) may also be accessed by querying global identifier information maintained in remote resource 420 (e.g., in DB 438 and/or data manager 434). For example, search server 426 may query data manager 434 (e.g., via content access 432) in order to determine what information is available on remote resource 420, as well as on apparatuses enabled to access remote resource 420 (e.g., apparatus 400). When desired information is located, remote resource 420 may respond with the desired information, global identifier information, etc. to the searching entity (e.g., other apparatus 460). The global identifier information may allow the inquiring apparatus to access the desired information at the source, request the transmission of the information, etc. In various embodiments of the present invention, global identification information may include at least a global identifier for identifying objects within an environment. For example, when there are one or more servers in remote resource 420, or in one or more environments of remote resource 420, a global identifier may uniquely identify objects within each environment. Global identification information may also be allocated by a separately-administered entity that operates on higher-level than remote resource 420. The global identifier may also be assigned within a server in a format that may enable other devices to identify the server that assigned the global identifier.

While all of the components discussed above with respect to remote resource 420 have been shown as existing as a consolidated entity, it should be noted that, in accordance with various embodiments of the present invention, Authentication 424, Web server 424, Search Server 426, etc. may each be configured as entities separate from Remote resource 420. In such configuration, wired/wireless communication connections may link any standalone components.

V. Examples of Instances Wherein Information may be Shared

Figure 5A:
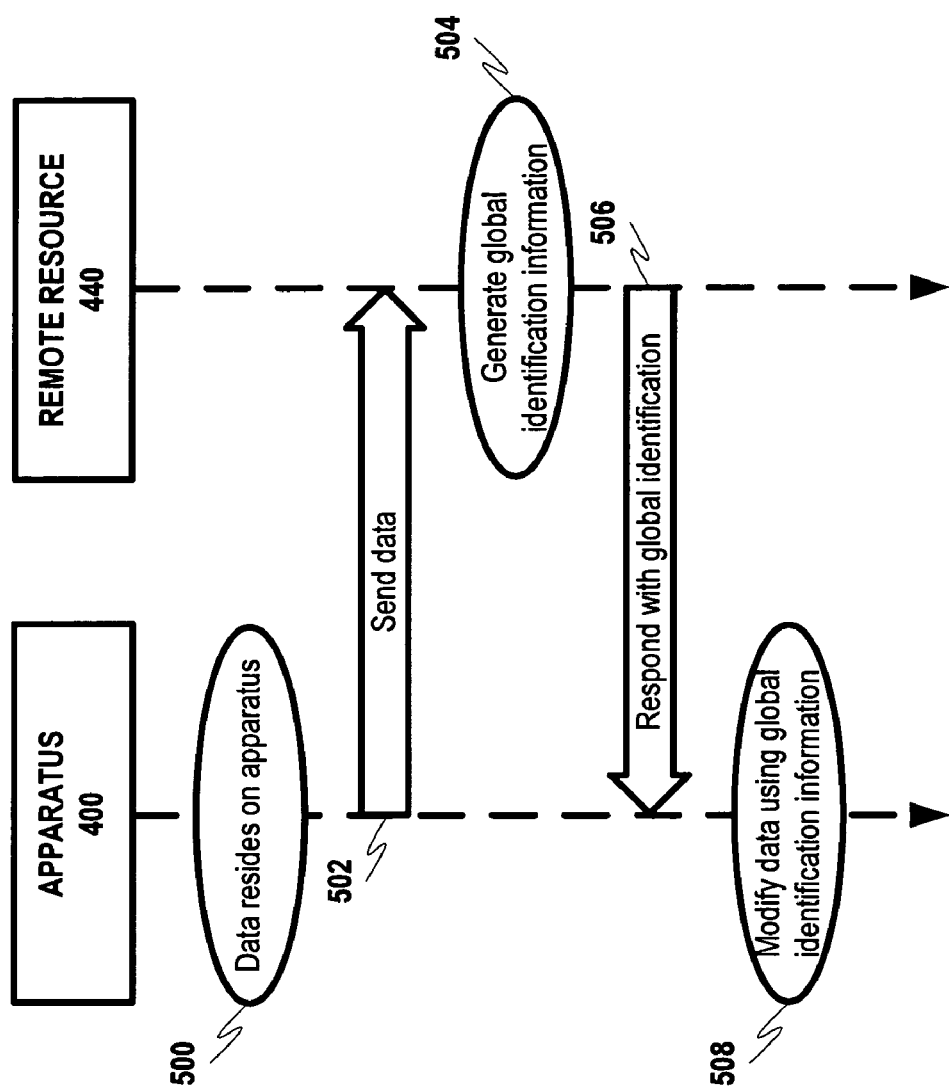
FIG. 5A discloses a timeline diagram of an exemplary interaction between a wireless apparatus and a remote resource in accordance with at least one embodiment of the present invention.

FIG. 5A-5E disclose timelines laying out exemplary transactions between devices that may share information in accordance with at least one embodiment of the present invention. In FIG. 5A, a user of apparatus 400 may execute an application residing in apparatus 400, and data output from the application may be stored in an object storage (e.g., DB 414) at 500. For example, when the application is a mapping application used for navigation and other location-related functionality, the object data stored may be for example location, collection, route, path, and traces data. A route object may, for example, describe a path between a starting location and an ending location. Apparatus 400 may obtain location data, for example, via location/direction 382, using an external GPS module coupled to the device, etc.

The user may then decide to upload (or synchronize) the objects for network storage in step 502 (e.g., to a personal account in a remote resource like ovi.com). Remote resource 440 may generate global identification information at 504 and then acknowledge the reception of data with a response message including the global identification information at 506. The global identification information may then be utilized by apparatus 400 to modify the local identification of the data at 508 so that it may be accessed from either local or remote storage.

As a part of normal operation, apparatus 400 may issue a synchronization request to remote resource 440 in order to synchronize the contents of DB 414 and DB 438. The request may be initiated, for example, by the device user using a specific action, at certain intervals, at certain times of day/week/month, based on device location, etc. The initiation may also be triggered from remote resource 440 when, for example, new information has been stored (e.g., in the ovi.com account associated with the user). Users may also access objects stored in ovi.com using, for example, a web interface in order to make modifications to the stored data, and thus, cause the synchronization of the objects with the objects stored on apparatus 400. New objects may also be created using the web interface, the creation of which may trigger a synchronization to occur between DB 414 and DB 438, making the new objects also available on apparatus 400.

Stored objects may also be extended with application specific data. For example, images and music files may be associated with location objects. In at least one scenario, when apparatus 400 arrives at a predetermined location (e.g., acquired via GPS), an associated image may be displayed, and/or music played, in the device. This may also enable the association of other application data such as calendar, note, document, message data, etc. For example, when arriving at a local department store a user may be notified of a shopping list stored either by the user, or if shared by other users of remote resource 440, that comprises user recommendations for shopping items. Further, other application-specific data may also be synchronized when a primary data object is synchronized, or a linking identifier may be stored with the object, enabling apparatus 400 to associate the application specific-data with the data object.

In addition, the exemplary system described above may, in accordance with at least one embodiment of the present invention, support other services such as small applications executing on top of MOS API 404. Examples of such small applications may include programs for storing bookmarks (e.g., favorites), for storing "maplet"/service related objects (wherein a maplet may be, for example, a small program specifically related to map, direction or location-related functionality), for synchronizing data on apparatus 400 with maplet specific service, etc.

The further examples disclosed in FIG. 5B-5E now include other apparatus 460 in addition to apparatus 400 (e.g., a device including some or all of the functionality of WCD 100), remote resource 440. Initially, in FIG. 5B a web-integrated service is activated in apparatus 400 at 510. While a web-integrated service is utilized in FIG. 5B for the sake of explanation, the various embodiments of the present invention do not require use of this particular type of application, and may instead be a software application executing in apparatus 400 without outside interaction.

After the application is activated, activity in apparatus 400 may result in the formulation of a data request to remote resource 440 at 512. For example, a user may configure the application to formulate information on a desired topic, and in order to fulfill this request, some or all of this desired information may be requested from remote resource 440. At 514, apparatus 400 may send a data request to remote resource 440. The data request may trigger the accessing of databases in remote resource 440, computation, etc. in order to produce the requested data, which is then sent back to apparatus 400 for eventual presentation to the user. The information sent by remote resource 440 may also include global identifier information.

A user may then decide to share some or all of the information resulting from the requested execution of the web-integrated service application at 516. When being used internally to an apparatus, information need only be identified by a local identifier. A local identifier may be an identifier known only to apparatus 400, and therefore, is not recognized by other apparatuses. However, as set forth above, remote resource may provide global identifier information with the information returned to apparatus 400. Apparatus 400 may then modify identification information corresponding to the information to be shared based on the global identifier information. Identification information for the shared information may be modified, for example, by replacing local identification information with global identification information, appending global identification information to local identification information, cross-referencing the local identification information to global identification information in apparatus 400, etc.

Other apparatus 460 (e.g., another device including computing capabilities such as a laptop computer coupled to the Internet via wired or wireless communication) may desire to access previously created information at 518. Shared information may be attractive to a user due to, for example, the desire to obtain previously unknown information, speed, time and processing savings in avoiding reformulation of the same information, descriptive material corresponding to the material, etc. In terms of the previous exemplary scenario, a user review of a mapped route may reside in remote resource 440 along with related global identifier information. This review may state, for example, that shared information pertains to a route for a trip that was extremely enjoyable. As a result, other users may want to access this information from apparatus 400.

Access to the previously created information may be requested in the transaction of 520. For example, other apparatus 460 may transmit a wireless message requesting access to apparatus 400. This request may include, for example, identification information confirming that other apparatus 460 (user, application, etc.) is allowed to access shared information. Apparatus 400 may then respond by granting access to other apparatus 460, sending the shared information (e.g., via wireless communication), etc. The above transaction may assume that other apparatus 460 is aware of the global identification information corresponding to the desired information. Messages in 520 may be sent using, for example, communication mediums such as SMS, MMS, email, instant messaging, Bluetooth, wireless LAN, short-range radio, Internet Protocol (IP), etc.

Figure 5C:
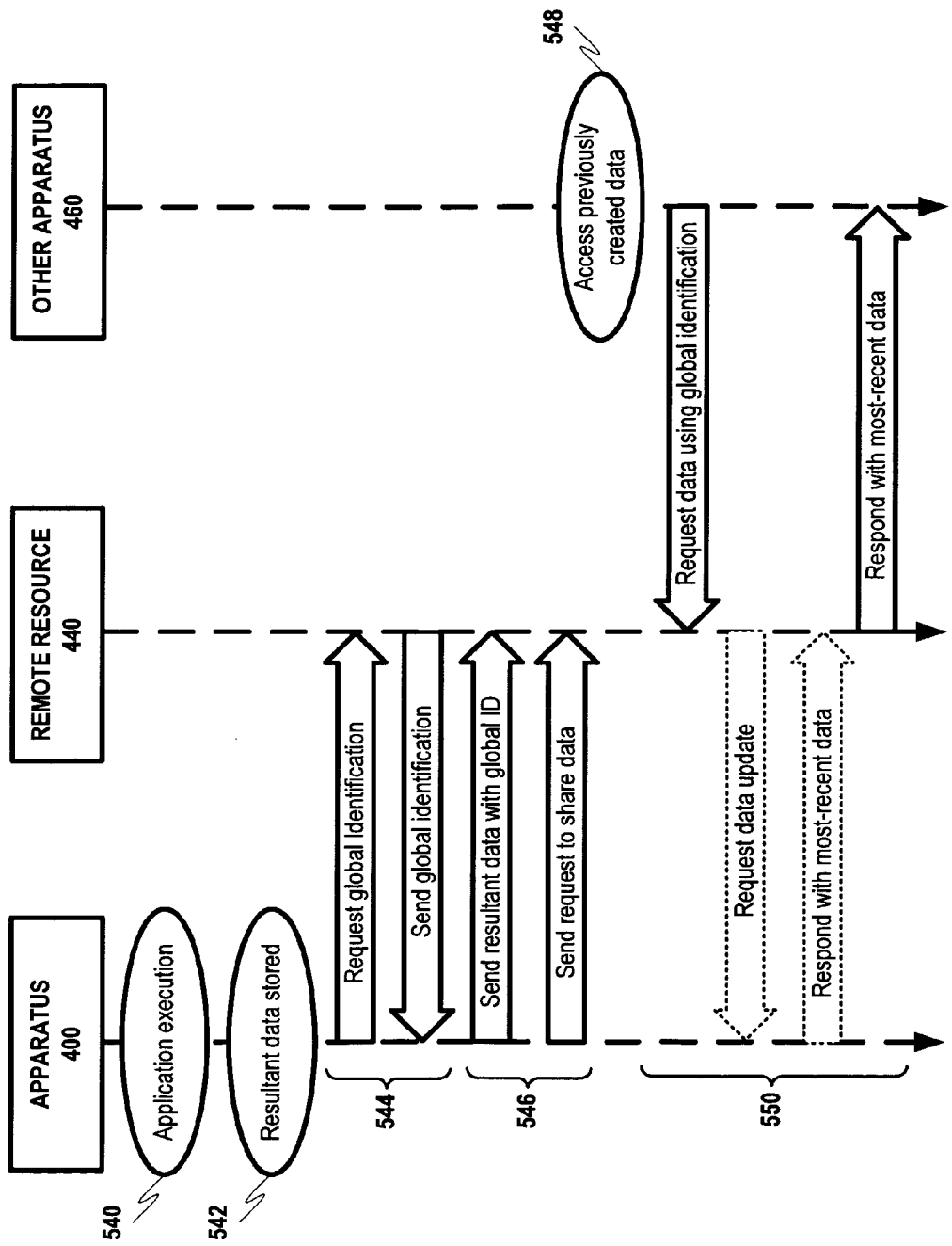
FIG. 5C discloses a timeline diagram of another exemplary interaction between a wireless apparatus, a remote resource and another apparatus in accordance with at least one embodiment of the present invention.

Now referring to FIG. 5C, another exemplary transaction in accordance with at least one embodiment of the present invention is disclosed. In this example, an application on apparatus 400 may execute at 540 (e.g., as configured by a user) resulting in data that is stored on apparatus 400 at 542. In a situation where the information to be shared is not retrieved from remote resource 440, and in such case has not already received global identification information, apparatus 400 may make a request for corresponding global identification information at 544. The information provided by apparatus 400 at 544 may both notify remote resource 440 of the existence of information to be shared (e.g., along with data that may be used for identifying and locating shared information), and may prompt assignment of global identification information that is returned to apparatus 400 for use in modifying the identification of shared information.

The actions shown at 546 may be executed in preparation for sharing information with other users of remote resource 440. Initially, resultant data to be shared on apparatus 400, and/or descriptive information pertaining to the resultant data to be shared, may be transmitted to remote resource 440 along with the corresponding global identification information. Then, if not already established, apparatus 400 may inform remote resource 440 that the resultant data on apparatus 400 is now available for sharing. At 548 another device (e.g., other apparatus 460) may decide that access to previously created shared information is desired. At 550 an inquiry may be made to remote resource 440. This inquiry may be a direct request for information using global identification information that is already known to other apparatus 460 (or its user), or alternatively, may be the result of searching performed by other apparatus 460 (e.g., through the use of search server 426 in remote resource 440) of shared information available to devices enabled (and possibly permitted) to interact with remote resource 440. In configurations where data may be centrally distributed through remote resource 440, at least one embodiment of the present invention may optionally include a request for updates of shared data from its origin before delivering the shared data to the requesting apparatus (e.g., other apparatus 460). If this optional feature is included, apparatus 400 may provide updates of the requested shared data to remote resource 440, which may then pass the updated information on to other apparatus 460.

FIG. 5D discloses an alternative exemplary configuration of the present invention. Apparatus 400 may send data with or without a request for global identifier at 564. The request may then trigger the assignment of global identification information to the data that may then be returned to apparatus 400. In step 566, apparatus 400 may send information to remote resource 440 regarding the desire to share data residing on apparatus 400. In step 568 the device that is sharing stored data acts to "advertise" the availability of this data. This advertisement may simply be a broadcast to all devices within communication range containing global identification information for shared information. Other apparatus 460 may be at least one device that receives the advertisement, and may in turn decide (e.g., the user may decide) that access to the advertised information is desired. At 570 other apparatus 460 may then request (and possibly retrieve) the advertised information in a manner similar to process 550 in FIG. 5C.

Figure 5E:
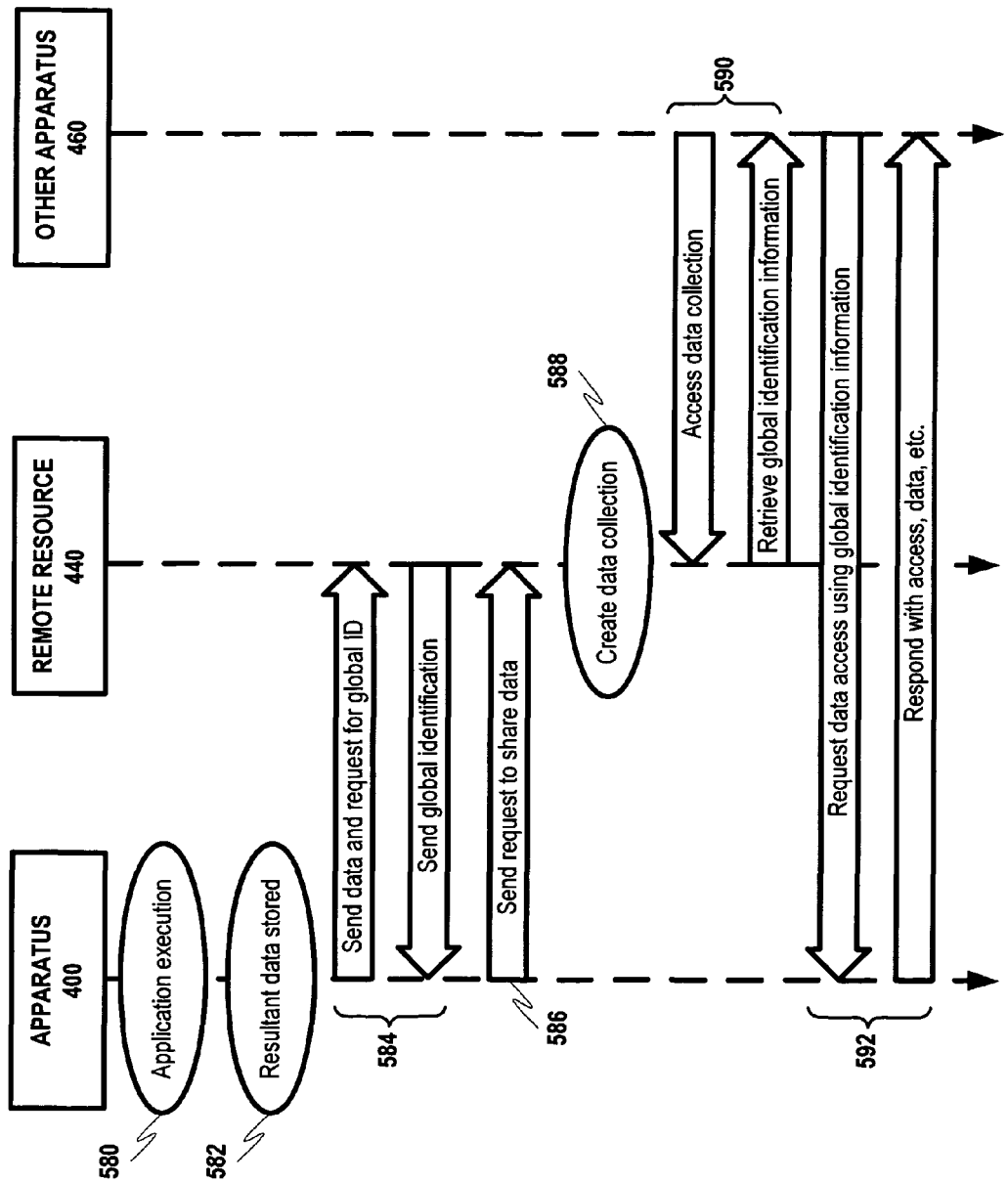
FIG. 5E discloses a timeline diagram of a fourth exemplary interaction between a wireless apparatus, a remote resource and another apparatus in accordance with at least one embodiment of the present invention.

Various exemplary embodiments of the present invention may also employ a data delivery architecture such as disclosed in FIG. 5E. Steps 580-586 may utilize the methodology set forth in the corresponding steps in either FIG. 5C or 5D, depending on, for example, the specific requirements of the implementation. This example is disclosed using the methodology of FIG. 5D. In this implementation remote resource 440 may establish a data collection at 588 including the global identification of shared information stored on apparatus 440. The data collection may comprise one or more objects. Other apparatus 460 may access the data collection at 590. This access may be in the form of a query that returns the identification of shared information that may be of use to a user, application or other apparatus 460 itself. Information that is available on remote resource 440 may be accessed directly. In the case of shared information residing on apparatus 400, other apparatus 460 may request access to this information at 592, to which apparatus 400 may grant access if appropriate (e.g., providing that identification/authentication of device, user and/or applications corresponding to other apparatus 460 are successful). Granting access may include, for example, allowing other apparatus 460 to retrieve shared information from apparatus 400, sending the shared information from apparatus 400 to other apparatus 460 (e.g., in the form of one or more wireless messages), making the information available in remote resource 440, etc.

Now referring to FIG. 6, a flowchart of an exemplary process, in accordance with at least one embodiment of the present invention, is now disclosed. In step 600 an application may be activated on an apparatus. A user may configure this application (e.g., by configuring one or more parameters in a user interface) in step 602 so as to generate a desired result (e.g., formulate directional information, obtain information on a particular subject, etc.) In step 604, a determination may be made as to whether additional information from outside of the apparatus will be required in order to complete processing in the configured application. If no additional information is required, then in step 606 the process may proceed to formulate the desired information (e.g., and display the information to a user, store and/or print the information, etc.)

However, if information from outside of the apparatus (e.g., information obtained from a remote resource) is required in order to produce resulting information in accordance with the user configuration, then in step 608 the establishment of a wired or wireless connection may be attempted. The wired or wireless connection may be undertaken in various communication transports, including any of the exemplary communication transports discussed herein. If the connection is successful in step 608, then the process may obtain the required information from the remote resource in step 610, including at least the information needed for the application and corresponding global identification information. The computing may then complete in step 606. However, if a link to the source of the additional information cannot be established in step 608, then further attempts may be made in step 612 until, for example, a connection establishment retry threshold has been exceeded. In this case, a communication error may then be displayed on the apparatus, and the process may return to initial step 600 to await another activation attempt.

Given the successful formulation of results in step 606, in accordance with the user configuration of step 602, a decision may further be made whether to share the resulting information in step 614. If it is decided that the information should not be shared, then the information may be retained only for local use in step 616. The exemplary process may then continue with a new application configuration in step 602, or alternatively, if no further interaction with the activated application is necessary, then in step 618 the process may complete and return to step 600 in order to await another requirement for application activation.

However, if it is determined that the information should be shared in step 614, then in step 620 connection establishment may be attempted to a remote resource (e.g., the same or a different remote resource than previously discussed with respect to step 608-612). If a link cannot be established and the connection establishment retry limit has been exceeded, per step 622, then the process may return to step 616 wherein the apparatus may continue to function in a standalone mode (e.g., using the information only on a local basis). A user may subsequently terminate the process in step 618, as previously described, and then restart the entire process at step 600 in order to reattempt configuration and sharing of information with other users.

If a connection is successfully established in step 620, then in step 624 the apparatus may execute or more activities to initiate sharing and/or configure shared data. For example, the apparatus may notify the remote resource, via wired or wireless communication, that shared information is now available on the apparatus. Further, the apparatus may provide updated information to the remote resource, including updates to the actual shared information itself or updates to related descriptive information. In at least one embodiment of the present invention, the remote resource may provide instructions for modifying identification information corresponding to the shared information based on relevant global identification information. As previously described, this modification may comprise replacing local identification information with global identification information, appending global identification information to local identification information, cross-referencing global identification information to local identification information in the apparatus, or other modifications that may be implemented in order to make shared data in the apparatus identifiable and/or accessible to other apparatuses. The process may then return to step 600 to await reactivation of an application on the apparatus.

VI. Other Use Cases Applicable to Various Embodiments of the Present Invention The present invention has been discussed in this disclosure in terms of a number of exemplary embodiments. One or more of these generalized embodiments may be applied to "real life" situations. One example may include a scenario wherein a user uploads information to a remote resource (e.g., data that is stored in a synchronization database on the server side). The information may be uploaded using, for example, SMS, MMS, email, instant messaging, etc. As a result, a constant connection is not required between the apparatus and the remote resource.

For example, a user may take photographs with a digital camera or another device including an embedded camera. The photographed images may then be sent to a remote resource (e.g., a service), via wired or wireless communication, where the images may be saved in a database on a server. The user may also associate location information with the images as well. Since the user could send the images using, for example, an MMS or email transport, a constant online connection between the remote resource 440 and the user's device would not be needed. The uploaded information may later be synchronized between the user's device and the remote resource to ensure that applications on the device and the remote resource utilize the same data.

In at least one embodiment of the present invention, the start of synchronization may be initiated by the user's device or by the remote resource. For example, when the user's device gains access to an available wireless LAN connection, it may initiate synchronization with the remote resource. Similarly, the remote resource could initiate the synchronization to the user's device when it receives new data items. This may occur, for instance, when users change information that is being shared (e.g., a shared map including user-updatable information), the server may initiate synchronization to apparatuses of users who have not yet received the update.

In another exemplary scenario, a user accessing a map application on a mobile device, or via a web service, may save previous inquiry results (e.g., including information regarding points-of-interest, mapped routes, etc.) When saving information regarding a recently visited destination, it is foreseeable that an address and/or an image may be associated with the physical location. The user may then synchronize the points-of-interest data saved on the device to a remote resource (e.g., online service), which may then make this information also available via web access. Alternatively, or in conjunction with the above, a user may mark routes, paths traveled, etc., and then synchronize this information with the online service. The online service may then assign global identification information for any such stored data using the various methods described herein.

In the event that a user wants to share synchronized points-of-interest, routes, etc., links to the remote resource may be sent to other users who may then access this information. Alternatively, or in conjunction with the above, a user may share the information via the online service directly, for example, by making the added points-of-interest, addresses, routes, etc. accessible to other users registered with the web service. Users may also choose to share (make visible, accessible, etc.) information with only some users, or all users, of the online service.

Other users accessing shared information may, for example, save the shared data locally to their devices, online accounts, etc., which may be later accessed to use the information. In at least one exemplary configuration of the present invention, users may refer to locally-saved shared information (e.g., point-of-interest, address, route information, etc.) using familiar names, and therefore, may not necessarily use the global identification information reserved by the system. For example, when sharing a home address location with a visiting friend, an online service may display "My home" in the user's account. The friend could view the shared information, provided by, for example, a link in the online service to a map displaying the physical location, or may save this information to their own account in the online service. In such a scenario, shared location information could be "saved" as "My friend's place." While the user-assigned alias may create the illusion that the shared information is locally stored, the system may continue to utilize the global identification information when referencing this information, which may help to conserve storage resources by not having to actually create a local copy of the information. Further, if a user wants to delete a location (and the corresponding global identification information), the remote resource may indicate that other users are utilizing this shared information, and then confirm the deletion. Alternatively, a device/account may delete only the local link to the shared information, so that other users may still access this information.

Examples of shared information may include, but are not limited to, location information, point-of-interest information, address information, route information, etc. Users may formulate this information using, for example, an application that directly links to a mobile resource via wired and/or wireless communication, accessing a webpage corresponding to the remote resource using a web browser, etc. Exemplary application or webpage based service interfaces may allow users to, inter alia, search, compile, mark, save and then share information. In addition, various embodiments of the present invention may allow users to access shared information that was previously created by friends or other users of the remote resource (service) via applications on mobile devices, Internet connections, etc. For example, a user may search for locations of interest, or find a particular restaurant reviewed by familiar or known users, search for restaurants/places near a given location which might be marked by the other service users. The user may then save these locations so that they are accessible (e.g., visible to other users) in, for example, an application executed on an apparatus, via an online account, etc.

Further to the above, other categories of sharable information may include, for example, images, video, music, web links, documents, etc. Users may also create montages (or collections) of various types of sharable information that may be related to a particular subject, event, etc. For example, users may name a group of items with an identifier "My holiday." My Holiday may include travel paths and locations the user visited on holiday (e.g., obtained from routes stored by the GPS of the mobile device, manually marked routes and points-of-interest by the user, etc.) and also associated images taken with a device or standalone camera that were uploaded (or synchronized) with a remote resource. The user may also save, for example, notes or reviews associated with a points-of-interest that would also be accessible as part of "My holiday" in the remote resource. The various exemplary embodiments of the present invention disclosed herein may enable the user to share all this information either directly with other users via their devices (e.g., using an application executed on the device), via an Internet browser, etc.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method comprising:
  determining to activate an application residing in a device;
  determining to configure the application prior to execution;
  determining to store data resulting from executing the configured application;
  receiving global identification information from a remote resource; and
  determining to modify identification information pertaining to the stored data based on the global identification information received in the device;
  wherein the stored data is directly accessible by another device based on the global identification information.

2. The method of claim 1, wherein at least the device and the remote resource are enabled to communicate wirelessly.

3. The method of claim 1, further comprising determining whether the stored data is to be shared.

4. The method of claim 3, further comprising requesting the global identification information from the remote resource if it is determined that the stored data is to be shared.

5. The method of claim 1, wherein the device causes, at least in part, direct transmission of the stored data to another device in response to a request based on the global identification information.

6. The method of claim 1, wherein the device is caused, at least in part, sending one or more unsolicited messages to another device, the messages including at least the global identification information.

7. The method of claim 1, wherein another device accesses a data collection residing in the remote resource, the data collection including global identification information for resources accessible by the other device including at least the stored data.

8. The method of claim 1, wherein executing the configured application comprises determining whether additional information is required to complete execution.

9. The method of claim 8, wherein the application requests the additional information from the remote resource via wireless communication, at least part of the received additional information being utilized in formulating the stored data.

10. A non-transitory computer-readable storage medium carrying one or more sequences of one or more instructions which, when executed by one or more processors, cause an apparatus to at least perform the following steps:
determining to activate an application residing in a device;
determining to configure the application prior to execution;
determining to store data resulting from executing the configured application;
receiving global identification information from a remote resource; and
determining to modify identification information pertaining to the stored data based on the global identification information received in the device,
wherein the stored data is directly accessible by another device based on the global identification information.

11. The non-transitory computer-readable storage medium of claim 10, wherein at least the device and the remote resource are enabled to communicate wirelessly.

12. The non-transitory computer-readable storage medium of claim 10, wherein the apparatus is caused to further perform:
determining whether the stored data is to be shared.

13. The non-transitory computer-readable storage medium of claim 12, wherein the apparatus is caused to further perform:
determining to request the global identification information from the remote resource if it is determined that the stored data is to be shared.

14. The non-transitory computer-readable storage medium of claim 10, wherein the device causes, at least in part, transmission of the stored data to another device in response to a request based on the global identification information.

15. The non-transitory computer-readable storage medium of claim 10, wherein the device is caused, at least in part to send one or more unsolicited messages to another device, the messages including at least the global identification information.

16. The non-transitory computer-readable storage medium of claim 10, wherein another device accesses a data collection residing in the remote resource, the data collection including global identification information for resources accessible by the other device including at least the stored data.

17. The non-transitory computer-readable storage medium of claim 10, wherein executing the configured application comprises determining whether additional information is required to complete execution.

18. The non-transitory computer-readable storage medium of claim 17, wherein the application requests the additional information from the remote resource via wireless communication, at least part of the received additional information being utilized in formulating the stored data.

19. An apparatus comprising:
at least one processor; and
at least one memory including computer program code for one or more programs,
the at least one memory and the computer program code configured to, with the at least one processor, cause the apparatus to perform at least the following:
determine to activate an application residing in a device;
determine to configure the application prior to execution;
determine to store data resulting from executing the configured application;
receive global identification information from a remote resource; and
determine to modify identification information pertaining to the stored data based on the global identification information received in the device;
wherein the stored data is directly accessible by another device based on the global identification information.

20. The apparatus of claim 19, wherein at least the device and the remote resource are enabled to communicate wirelessly.

21. The apparatus of claim 19, wherein the apparatus is further caused to:
determine whether the stored data is to be shared.

22. The apparatus of claim 21, wherein the apparatus is further caused to:
determine to request the global identification information from the remote resource if it is determined that the stored data is to be shared.

23. The apparatus of claim 19, wherein the device causes, at least in part, transmission of the stored data to another device in response to a request based on the global identification information.

24. The apparatus of claim 19, wherein the device causes, at least in part, sending of one or more unsolicited messages to another device, the messages including at least the global identification information.

25. The apparatus of claim 19, wherein another device accesses a data collection residing in the remote resource, the data collection including global identification information for resources accessible by the other device including at least the stored data.

26. The apparatus of claim 19, wherein executing the configured application comprises determining whether additional information is required to complete execution.

27. The apparatus of claim 26, wherein the application requests the additional information from the remote resource via wireless communication, at least part of the received additional information being utilized in formulating the stored data.

28. An apparatus comprising:
means for determining to activate an application residing in a device;
means for determining to configure the application prior to execution;
means for determining to store data resulting from executing the configured application;
means for receiving global identification information from a remote resource; and means for determining to modify identification information pertaining to the stored data based on the global identification information received in the device;
wherein the stored data is directly accessible by another device based on the global identification information.

29. A chipset comprising:

a processor; and at least one memory, the at least one memory being configured with computer readable program code that, when executed by the processor:
- activates an application residing in a device;
- configures the application prior to execution;
- determines to store data resulting from executing the configured application;
- receives global identification information from a remote resource; and
- modifies identification information pertaining to the stored data based on the global identification information received in the device;
- wherein the stored data is directly accessible by another device based on the global identification information.

30. A system comprising:

at least one device; and a remote resource;

the at least one device activating an application, the application being configured prior to execution;

the at least one device storing data resulting from executing the configured application; and the at least one device receiving global identification information from the remote resource and modifying identification information pertaining to the stored data based on the global identification information received in the device;

wherein the stored data is directly accessible by another device based on the global identification information.

31. An apparatus comprising:

at least one processor; and at least one memory including computer program code for one or more programs, the at least one memory and the computer program code configured to, with the at least one processor, cause the apparatus to perform at least the following:
- receive data from at least one device;
- determine to generate global identification information;
- determine to assign the global identification information to the received data; and
- determine to transmit at least the assigned global identification information to the at least one device;
- wherein the data is directly accessible by another device based on the assigned global identification information.

* * * * *